United States Patent [19]
Berry

[11] 4,285,138
[45] Aug. 25, 1981

[54] TRAILER HITCH VISUAL ALIGNMENT DEVICE

[76] Inventor: James L. Berry, #29 Hilton Head Ter., Hilton Head, S.C. 29928

[21] Appl. No.: 130,139

[22] Filed: Mar. 13, 1980

[51] Int. Cl.³ .......................... G01C 5/00; B60D 1/06
[52] U.S. Cl. ........................................ 33/264; 33/373; 280/477
[58] Field of Search ................. 33/264, 265, 347, 372, 33/373; 280/477

[56] References Cited

U.S. PATENT DOCUMENTS

| | | | |
|---|---|---|---|
| 2,984,011 | 5/1961 | Hamilton | 33/264 |
| 3,013,336 | 12/1961 | Pennington | 33/265 |
| 3,015,162 | 1/1962 | Bohnet | 33/264 |
| 3,702,029 | 11/1972 | Anderson | 33/264 |
| 3,765,703 | 10/1973 | Voelkerding | 280/477 |
| 3,818,599 | 6/1974 | Tague | 280/477 |
| 3,866,328 | 2/1975 | Alexander | 33/264 |
| 3,867,898 | 2/1975 | Lakamp | 280/477 |
| 3,889,384 | 6/1975 | White | 33/264 |
| 3,918,746 | 11/1975 | Lehtisaari | 33/264 |
| 4,012,056 | 3/1977 | Christensen | 280/477 |
| 4,054,302 | 10/1977 | Campbell | 33/264 |
| 4,156,972 | 6/1979 | Vankrevelen | 33/264 |
| 4,169,610 | 10/1979 | Paufler | 280/477 |

Primary Examiner—Steven L. Stephan
Attorney, Agent, or Firm—Wilkinson, Mawhinney & Theibault

[57] ABSTRACT

The disclosure herein in directed to aligning devices for aligning a towing vehicle with a trailer wherein the towing vehicle has a ball and the trailer vehicle a socket carrying arm. A pair of magnetic bases having vertically positionable wands are placed one on the towing vehicle and one on the trailer. Each wand has an elastic gromet slidable along its length for retaining a signal flag on its upper side and to permit passage between the wand and the gromet of a plumb line. There are two plumb lines and two plumb bobs which when the lines are vertical and the two plumb bobs positioned immediately above the ball and the trailer socket, the alignment flags will be horizontal so that when the vehicle is backed toward the trailer unit the flags cross then hookup can be effectuated.

4 Claims, 6 Drawing Figures

TRAILER HITCH VISUAL ALIGNMENT DEVICE

TECHNICAL FIELD

The invention disclosed herein relates to aligning a tractor vehicle with a trailer so that when the tractor is in position with its towing ball relative to a mating socket device on the trailer draft arm hookup may be effectuated upon a visual indication to the driver of the tractor vehicle.

BACKGROUND ART

Numerous devices have been advanced each having one unit attached to the towing vehicle and another unit carried by the hitch or towing tongue of the vehicle to be towed. Such devices are shown and described in the following U.S. patents:

Hamilton—U.S. Pat. No. 2,984,011
Anderson—U.S. Pat. No. 3,702,029
Voelkerding et al—U.S. Pat. No. 3,765,703
Lakamp—U.S. Pat. No. 3,867,898
Alexander et al—U.S. Pat. No. 3,866,328
White—U.S. Pat. No. 3,889,384
Lehtisaari—U.S. Pat. No. 3,918,746
Vankrevelen—U.S. Pat. No. 4,156,972
Campbell—U.S. Pat. No. 4,054,302
The art to which particular attention is directed
Bohnet—U.S. Pat. No. 3,015,162
Tague—U.S. Pat. No. 3,818,599 however neither prior art structure teaches the use of a pair of quickly applied magnetic bases and wands with signal flags and gromets for cooperating with a pair of plumb lines each having a plumb bob positionable directly over the towing ball on one hand and the trailer socket on the other hand which vertical alignment will control the position of the alignment signal flags on the respective wands so that when the towing vehicle backs toward the trailer vehicle, when the flags cross hookup can be effectuated, thereafter, the bases, wands and plumb lines may be removed to avoid theft either during transport or periods of non-use.

DISCLOSURE OF THE INVENTION

This disclosure is directed to a pair of units one of which is attached to a towing vehicle and the other of which is attached to a trailer vehicle for aligning a towing ball on the vehicle and a socket connection on a trailer draft arm. Each unit carries an alignment flag which is positioned by a plumb line, the plumb bob of each of which is positioned vertically above the towing ball on the one hand and the trailer socket on the other hand so that the alignment flags are in the horizontal plane. When so arranged and the towing vehicle is backed toward the trailer when the flags cross the two coupling units are in vertical alignment for hookup.

BEST MODE FOR CARRYING OUT THE INVENTION

Figure 1:
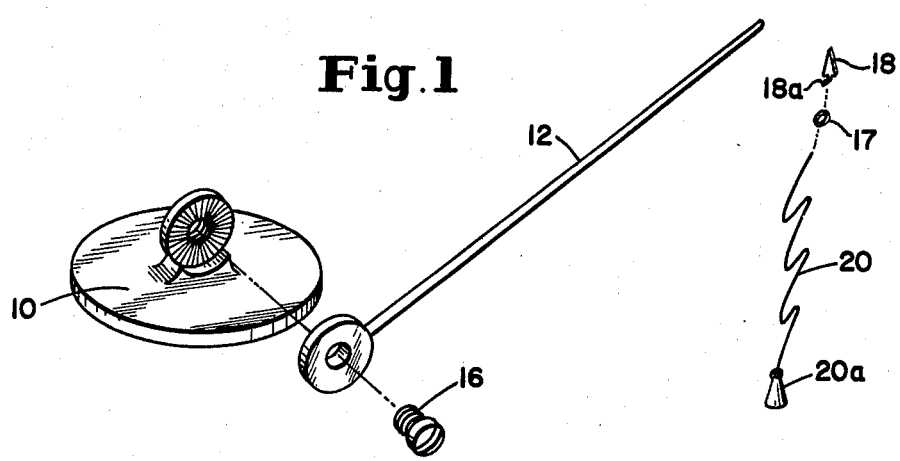
FIG. 1 is an exploded perspective view of one of a pair of trailer hitch visual alignment devices constructed in accordance with the present invention.
Figure 2:
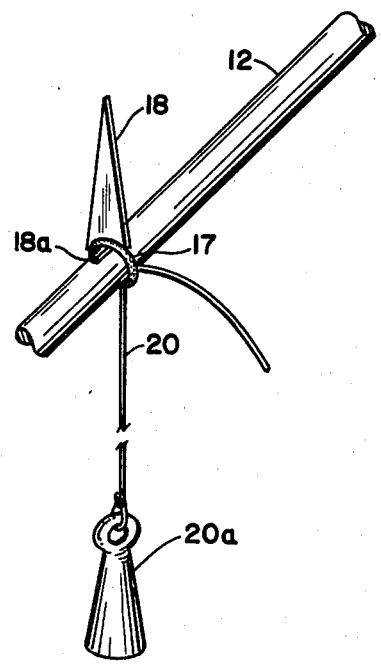
FIG. 2 is an enlarged fragmentary perspective view of one of the alignment devices of FIG. 1.
Figure 3:
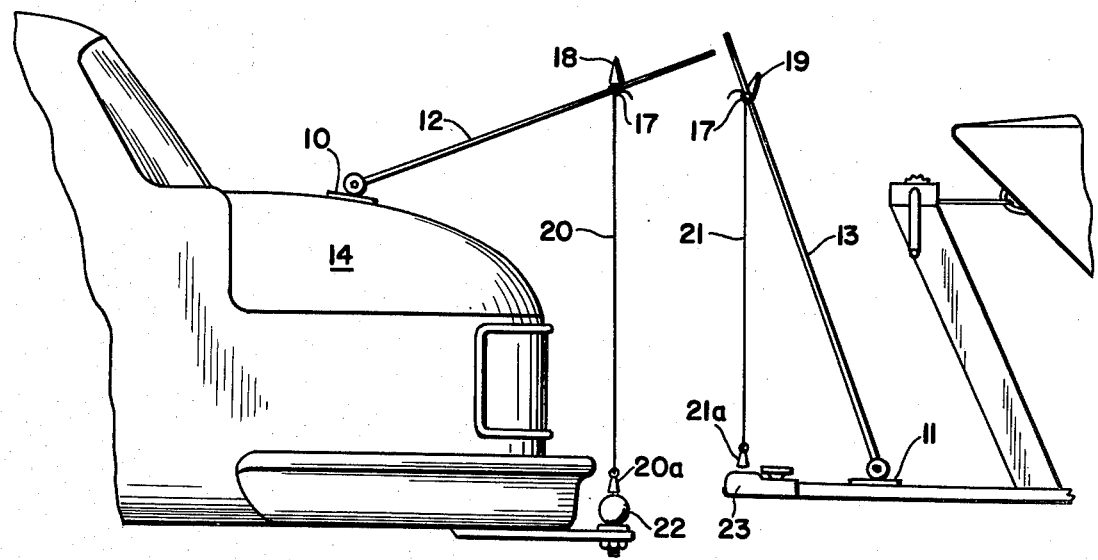
FIGS. 3 through 5 are side elevational sequential views showing the alignment devices of FIG. 1 in sequence of alignment for hookup between a vehicle and boat trailer.

Referring now to FIGS. 1 through 3, 10, 11 designate a pair of magnetic bases each having an upstanding attaching lug with a serrated face which will interlock with a complemental serrated face to which alignment wands 2, 13 are secured. The bases 10, 11 are positioned one upon the vehicle trunk 14, and the other upon the trailer socket carrying arm 15. A locking screw 16 is tightened to interlock the serrated faces and preserve the desired positioning of the alignment wands 12, 13, for example as shown in FIG. 3.

An elastic gromet 17 is slid along each wand 12, 13 until both can be seen through the towing vehicle rear window at which time the alignment flags 18, 19 each having a foot 18a, 19a is placed as shown in FIG. 2 with the feet between the elastic gromet and wand.

A pair of plumb lines 20, 21 each having a plumb bob 20a, 21a are then attached as shown in FIGS. 2 and 3 by passing the plumb lines 20, 21 between the elastic gromets 17 and the wands 12, 13 until the plumb bobs 20a, 21a are properly positioned just above the ball 22 of the vehicle hitch arm with respect to plumb bob 20a and plumb bob 21a just above the socket 23 on the trailer socket arm. The alignment flags 18, 19 as viewed by the vehicle driver through the rear window are now in horizontal alignment.

Figure 4:
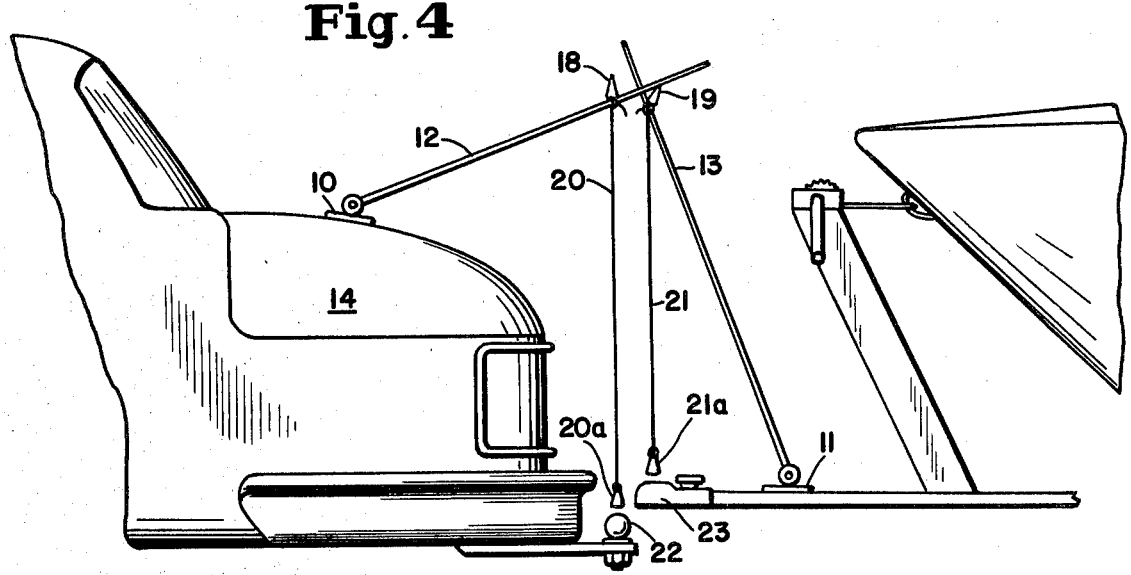
Figure 5:
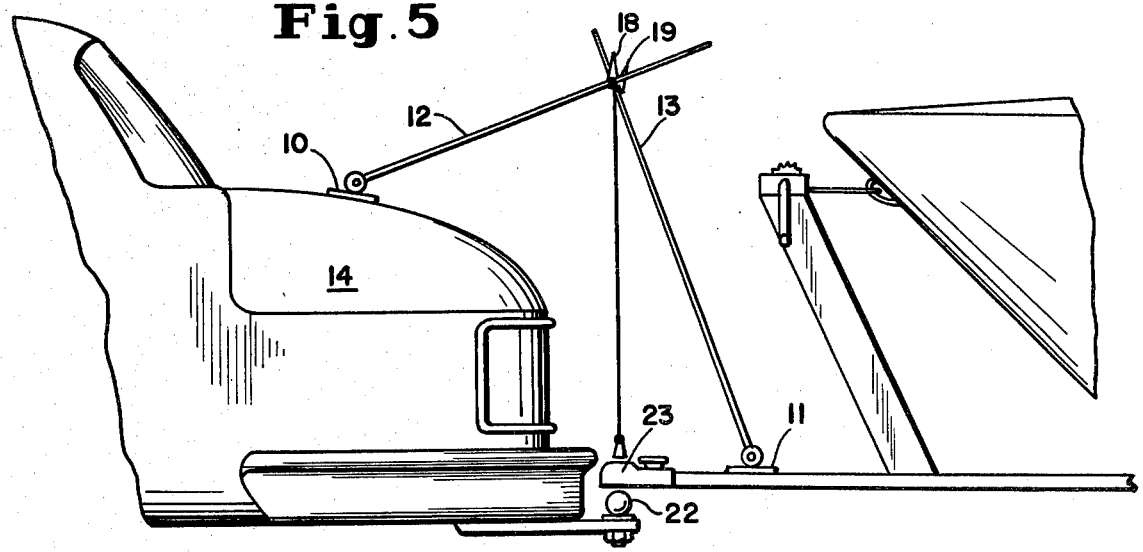

The vehicle is then backed toward the trailer with the operator looking through the rear window. As shown in the sequences of FIGS. 3, 4 and 5 the alignment flags 18 and 19 will approach one another. When the two alignment flags 18 and 19 cross the hitch socket 23 and towing ball 22 are perfectly aligned and the trailer hitch can be secured to the towing ball and the hookup completed for towing the trailer.

Figure 6:
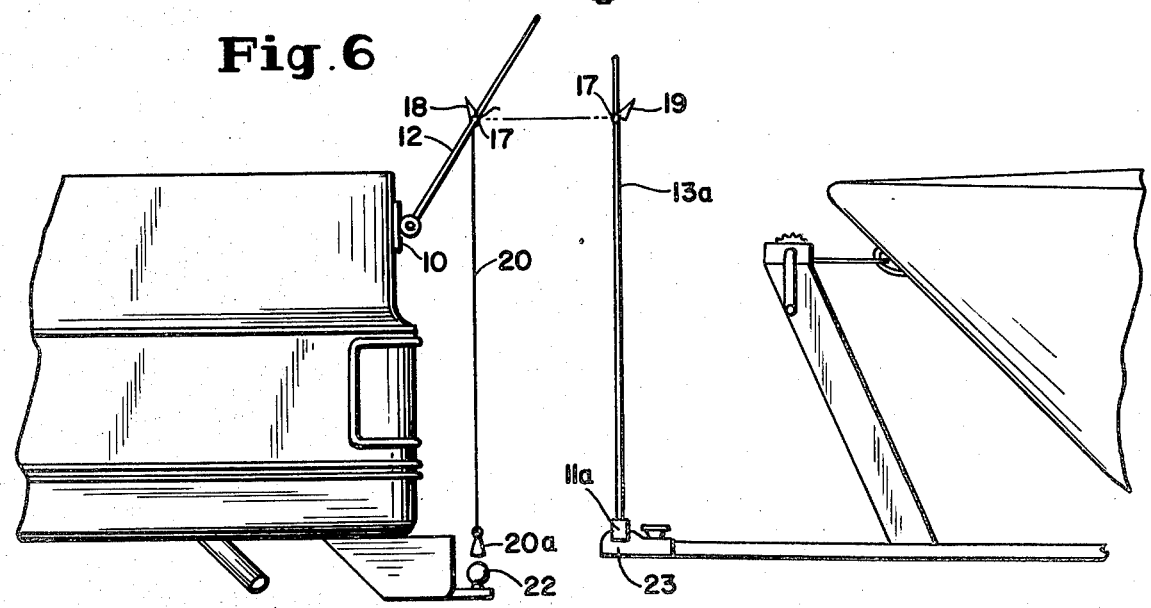
FIG. 6 is a side elevational view of a pickup truck and boat trailer employing a modified form of alignment wand and base for effecting hookup for towing.

In the embodiment shown in FIG. 6 the trailer wand 13a is connected to the magnetic base 11a so as to be vertical requiring only one plumb line and plumb bob. The same gromets and flags are employed in this embodiment only the magnetic base 11a is placed directly over the trailer socket 23. The mode of alignment until the two alignment flags cross is the same as in FIGS. 3 through 5.

What is claimed:

1. For use with a ball carrying hitch arm secured to the rear of a towing vehicle centrally thereof and a trailer having a socket carrying arm to arrange a hookup coupling between said ball and said socket; a trailer hitch visual alignment device comprising
   (a) a pair of magnetic bases one of which is attachable to the body of the towing vehicle and the other of which is attachable to the socket carrying arm of the trailer,
   (b) alignment wands carried by said magnetic bases,
   (c) a elastic gromet on each alignment wand,
   (d) a pair of alignment flags each having a foot extending off its base and adapted to be retained between said elastic gromet and each wand,
   (e) and a plumb line having a plumb bob carried by at least one of said wands and being adjustable through the contact point of the gromet and wand until the line is plumb over the towing ball whereby upon backing the towing vehicle toward the trailer when the alignment flags cross the hitch between the ball on the hitch arm and socket on the trailer arm may be coupled for towing the trailer.

2. A trailer hitch visual alignment device as claimed in claim 1 wherein each alignment wand is adjustably secured to its magnetic base through a minimum arc of 90°.

3. A trailer hitch visual alignment device as claimed in claim 2 wherein two plumb lines and plumb bobs are employed, the lines being passed through the elastic gromets until the plumb bobs are positioned one above the towing ball and the other above the towing socket.

4. For use with a ball carrying hitch arm secured to the rear of a towing vehicle centrally thereof and a trailer having a socket carrying arm to arrange a hookup coupling between said ball and said socket; a trailer hitch visual alignment device comprising
   (a) a pair of magnetic bases one of which is attachable to the body of the towing vehicle and the other of which is attachable to the socket carrying arm of the trailer,
   (b) alignment wands carried by each of said magnetic bases and being adjustably secured to its respective base through a minimum arc of 90°,
   (c) an elastic gromet on each alignment wand and being slidable along the length thereof,
   (d) a pair of alignment flags, one for each wand and having a foot extending off its base and being adapted to be retained between said elastic gromet and said wands,
   (e) and a pair of plumb lines each having a plumb bob at one end, said plumb lines being adapted to be passed through the elastic gromet between the wand and gromet until the plumb bobs are positioned one above the towing ball and the other above the towing socket when the plumb lines pass between the elastic gromet and alignment wand opposite said alignment flags.

* * * * *